(12) United States Patent
Ghera et al.

(10) Patent No.: US 8,643,941 B2
(45) Date of Patent: Feb. 4, 2014

(54) AUTOMATIC MEASUREMENT AND GAIN CONTROL OF DISTRIBUTED RAMAN AMPLIFIERS

(75) Inventors: Uri Ghera, Tel Aviv (IL); Alex Shlifer, Rechovot (IL); Daniel Berger, Bnei-Brak (IL); Mark Zaacks, Petach Tikva (IL); David Menashe, Raanana (IL)

(73) Assignee: Finisar Israel Ltd., Nes Ziona (IL)

( * ) Notice: Subject to any disclaimer, the term of this patent is extended or adjusted under 35 U.S.C. 154(b) by 470 days.

(21) Appl. No.: 12/946,899

(22) Filed: Nov. 16, 2010

(65) Prior Publication Data

US 2011/0141552 A1    Jun. 16, 2011

Related U.S. Application Data

(60) Provisional application No. 61/286,024, filed on Dec. 14, 2009.

(51) Int. Cl.
  *H01S 3/30* (2006.01)
  *H04B 10/17* (2011.01)
  *H04B 10/12* (2011.01)

(52) U.S. Cl.
  USPC .......................................... 359/334; 359/341.4

(58) Field of Classification Search
  USPC .................... 359/334, 341.1, 341.41
  See application file for complete search history.

(56) References Cited

U.S. PATENT DOCUMENTS

| | | | |
|---|---|---|---|
| 6,292,288 B1 * | 9/2001 | Akasaka et al. | 359/334 |
| 6,441,950 B1 * | 8/2002 | Chen et al. | 359/334 |
| 6,441,951 B1 | 8/2002 | Tanaka et al. | |
| 6,519,082 B2 | 2/2003 | Ghera et al. | |
| 6,624,926 B1 * | 9/2003 | Hayashi et al. | 359/334 |
| 6,631,025 B2 | 10/2003 | Islam et al. | |
| 6,724,524 B1 * | 4/2004 | Evans et al. | 359/334 |
| 6,785,042 B1 * | 8/2004 | Onaka et al. | 359/334 |
| 7,061,665 B2 | 6/2006 | Sobe et al. | |
| 7,116,471 B2 | 10/2006 | Ghera et al. | |
| 7,283,292 B2 | 10/2007 | Ghera et al. | |
| 7,554,721 B2 | 6/2009 | Hiraizumi et al. | |
| 2002/0140927 A1 * | 10/2002 | Sobe et al. | 356/73.1 |
| 2004/0160664 A1 * | 8/2004 | Sobe et al. | 359/334 |
| 2005/0105167 A1 | 5/2005 | Martinelli et al. | |
| 2008/0074734 A1 * | 3/2008 | Nissov et al. | 359/337 |

OTHER PUBLICATIONS

G.P. Agrawal, "Non-linear fiber optics",1995, pp. 316-343, Academic Press, 2nd Edition.
G.P. Agrawal, "Non-linear fiber optics",1995, pp. 344-369, Academic Press, 2nd Edition.

\* cited by examiner

*Primary Examiner* — Eric Bolda
(74) *Attorney, Agent, or Firm* — Nathan & Associates Patent Agents Ltd.; Menachem Nathan (57) ABSTRACT

Apparatus and method for gain measurement and control of a Distributed Raman Amplifier (DRA). Various embodiments of the apparatus include a detection unit operative to measure, during operation of the DRA, the optical power of a filtered component of the light entering the DRA from the transmission fiber and a gain calculation and control unit coupled to the detection unit and operative to calculate a signal Raman gain property from the measured optical power. The filtered component may exemplarily be a result of passing the light through a band pass filter, a spectral filter with a given spectral shape or a notch filter. The signal Raman gain property may be an average on-off signal Raman gain, an average net signal Raman gain or a signal Raman gain tilt within a communication band. The apparatus and method may be used to operate the DRA in Automatic Gain Control, i.e. to maintain a required constant signal Raman gain and/or signal Raman gain tilt.

21 Claims, 11 Drawing Sheets

FIG. 1 – KNOWN ART

AUTOMATIC MEASUREMENT AND GAIN CONTROL OF DISTRIBUTED RAMAN AMPLIFIERS

CROSS REFERENCE TO RELATED APPLICATIONS

This application claims priority from U.S. Provisional Patent Application No. 61/286,024 titled "Method and system for automatic gain control in distributed Raman amplifiers" and filed 14 Dec. 2009, which is incorporated herein by reference in its entirety.

FIELD

Embodiments of the invention relate generally to optical fiber amplifiers used in fiber optics telecommunications systems and more particularly to distributed Raman amplifiers (DRAs).

BACKGROUND

A modern optical communication system (also referred to herein simply as "system") utilizes optical amplifiers to amplify wavelength division multiplexed (WDM) signal channels as they are transmitted through the system. The first optical amplifiers to be commercially deployed were Erbium doped fiber amplifiers (EDFAs), which are self-contained units placed between 60-120 km length spans of a communication link. These units contain a special Erbium doped fiber (EDF) which serves as the gain medium used to transfer energy from laser diode pumps within the units to the optical signal channels as they pass through the unit. These amplifiers are typically operated in Automatic Gain Control (AGC) mode, where a control loop measures the signal gain of the amplifier using input and output signal power detectors and controls the laser pump (or pumps) within the amplifier to achieve the required gain.

In recent years, a new type of amplifier, namely a distributed Raman amplifier (DRA), was introduced into optical communication systems. A significant difference between an EDFA and a DRA is that for the latter, the transmission fiber itself serves as the gain medium, meaning that the signal channels are amplified as they travel through the transmission fiber. Thus, the DRA itself just provides pump power and control functionality, while the actual amplification process takes place in a distributed manner along the transmission fiber, as opposed to being lumped in a self-contained unit (as in an EDFA). This allows the length of fiber transmission spans to be increased beyond 120 km, and/or the optical signal to noise ratio (OSNR) of the system to be improved, thus allowing higher bandwidth communication.

Figure 1:
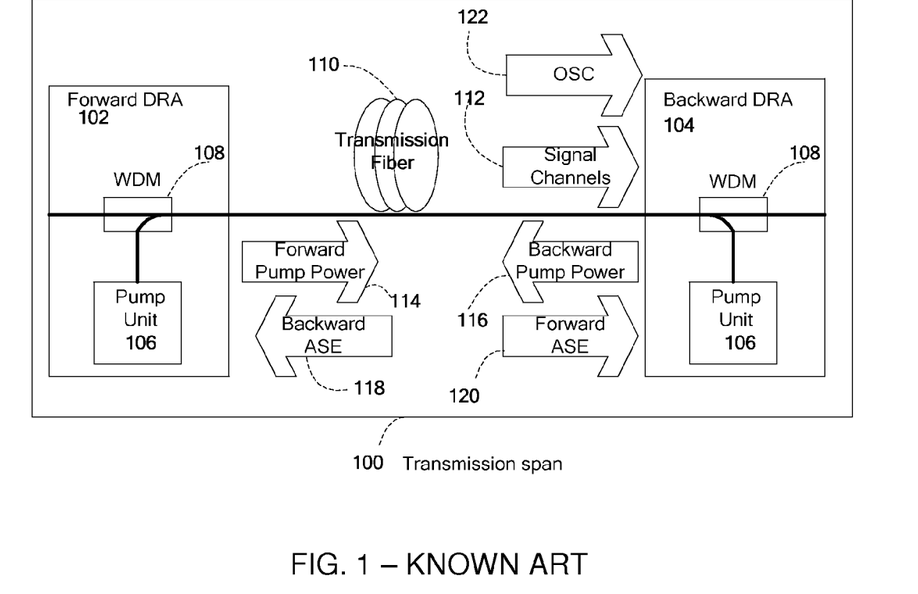
FIG. 1 shows an example of a span of an optical communication link employing DRAs.

DRAs and their applications to optical communication systems are known, see for example U.S. Pat. Nos. 6,519,082 and 6,631,025. FIG. 1 shows a schematic representation of a single transmission span 100 of a known optical communication system comprising a forward (or co-propagating) DRA 102, a backward (or counter-propagating) DRA 104 and a transmission fiber 110. In many cases, only the backward DRA is used. In some cases, the forward DRA or both backward and forward DRAs is/are used. Transmission span 100 may be preceded by an optical transmitter or by another amplifier, and may be followed by an optical receiver or by another amplifier, depending on the configuration of the optical communication system. In the case where the transmission span is followed by another amplifier, the DRA may optionally be packaged together with that amplifier, and may even have a common control unit and interface with that amplifier. The same applies to forward DRA 102, which may be packaged with an amplifier preceding it. For example, a DRA may be packaged together with an EDFA, to form a hybrid Raman/EDFA amplifier, as known in the art.

DRAs 102 and 104 include each a pump unit 106 with a high power pump laser, coupled to a Wavelength Division Multiplexer (WDM) 108. The WDM couples the pump power emitted from pump unit 106 to signal channels 112 which propagate along the span. For forward DRA 102, the forward pump power 114 is coupled to the input of transmission fiber 110 and propagates in the same direction as signal channels 112 ("co-propagating DRA"), while for backward DRA 104, the backward pump power 116 is coupled to the output of transmission fiber 110 and propagates in the opposite direction to signal channels 112 ("counter-propagating DRA").

As the pump power propagates along the transmission fiber (either in forward or backward configuration), power is transferred to the optical signal channels, thus causing them to be amplified during their propagation along the fiber. The transfer of energy occurs due to the non-linear stimulated Raman scattering effect, as described for example in "Non-linear fiber optics", by G. P. Agrawal, pp. 316-369, Academic Press, $2^{nd}$ Edition, 1995, which is incorporated herein by reference in its entirety. In addition to signal channels amplification, noise is also created due to spontaneous Raman scattering, which is then amplified by the pump power to create amplified spontaneous emission (ASE) noise. A backward ASE noise 118 propagates in the opposite direction to signal channels 112, while forward ASE 120 propagates in the same direction as signal channels 112.

In order for the signal Raman amplification to be effective, the optical frequency of the pump lasers should be about 13 THz higher than that of the optical signal channels. Thus, if for example the optical signal channels occupy the communication band known as the C band (1525-1565 nm), the wavelength of the pump lasers should be in the range of 1420 nm-1480 nm. The term "communication band" is used to refer to the wavelength band containing the WDM signal channels transmitted by the system. The other commonly used communications band is the L band (about 1570-1610 nm). Other communication bands may be used in the future, and a single system may contain multiple communication bands. Multiple pumps with different wavelengths may be utilized to achieve uniform amplification over the entire communication band, or even over multiple bands.

In addition to the optical signal channels, some systems also include an optical supervisory channel (OSC) 122 which is transmitted along the system and is used to transmit system management information from one site in the system to another. The OSC is located in a wavelength band separate to the communication band. For example, if the communication band is the C-Band, then often the OSC is located in the 1500-1520 nm band. When a DRA is used, the OSC can also be amplified by the Raman pump power, though the gain of the OSC is typically different to that of the signal channels within the communication band.

Since for a DRA the amplification occurs along the entire transmission fiber, the signal Raman gain cannot be measured directly by measuring the signal input and output powers as in a regular lumped amplifier (such as an EDFA). This is due to the fact that at a given physical location along the link (for example at the beginning or end of the link where the DRA is placed) one does not have simultaneous access to both the signal input power and the signal output power. Furthermore, during operation, i.e. when the Raman pumps are operational and a signal is being transmitted, changes in the signal Raman gain cannot be directly measured, since changes in the signal power level can indicate add/drop of a signal channel and/or changes in the transmission line loss and not necessarily changes in the signal Raman gain. The lack of a direct method of measuring the signal Raman gain or changes in the signal Raman gain severely complicates the operation of the amplifier in AGC mode.

Until recently, most DRAs were operated in a manual mode, where the pump power is pre-set manually and the signal Raman gain is measured manually once during installation. The measured gain is then used to configure the rest of the system (e.g. the other amplifiers), and any change over time is compensated for by other amplifiers in the system. This manual mode of operation is sufficient for relatively small scale DRA deployment, but not for large-scale deployment where DRA is implemented in every span of an optical communications system. In the latter case, it is required to operate the DRA in AGC mode in order to simplify the installation and operation of the system.

There is therefore a need for, and it would be advantageous to have, apparatuses and methods for accurate gain measurement and control in DRAs. In particular, it would be advantageous to have apparatuses and methods for accurate measurement of the signal Raman gain and signal Raman gain tilt before and during DRA operation, thus allowing full AGC operation.

SUMMARY OF THE INVENTION

Embodiments of the invention disclose apparatuses and methods for providing accurate measurement of the signal Raman gain and changes in the signal Raman gain provided by DRAs during operation, thereby allowing to operate a DRA in full AGC mode.

In some embodiments, there is provided an apparatus for automatic gain measurement and control of a DRA, the DRA providing Raman pump power at one or more pump wavelengths and being optically coupled to a transmission fiber which carries communication signals having wavelengths in a signal communication band, the apparatus including a detection unit operative to measure, during operation of the DRA, the optical power of a filtered component of the light entering the DRA from the transmission fiber and a gain calculation and control (GCC) unit electrically coupled to the detection unit and operative to calculate a signal Raman gain property. As used herein, "during operation" refers to a state in which the Raman pumps are operational and a communication signal is being transmitted along the transmission fiber. As used herein, the term "filtered component of light" refers to light or one or more components of light filtered with, for example, a band-pass filter, a spectral filter with a given spectral shape, a notch filter, etc. The filter may be designed to filter only certain components of the light, for example only the signals in the communication band, OSC signals, ASE in a desired wavelength band, or a combination thereof.

In an embodiment, the GCC unit is further operative to control the pump power. In some embodiments, the signal Raman gain property may be an average on-off signal Raman gain, an average net signal Raman gain or a signal Raman gain tilt. In an embodiment, the detection unit may include a gain flattening filter (GFF) configured to spectrally flatten a communication signal Raman gain, a first detector configured to detect the optical power of the light before it passes through the GFF and a second detector configured to detect the optical power of the light after is passes through the GFF. In an embodiment, the GCC unit may be further operative to calculate a net signal Raman gain by taking a first reading from the first detector before operation of the DRA, taking a second reading from the second detector during operation of the DRA, and calculating a difference between the second and the first readings. In an embodiment, the detection unit may include an OSC detector configured to measure the power of an OSC transmitted through the transmission fiber in an OSC band. In an embodiment, the detection unit may include a detector configured to measure ASE power in a wavelength band different from that of the communication band and of an OSC band. In an embodiment, the detection unit may further include a signal detection sub-unit operative to measure the signal power and the GCC unit may be further operative to determine a change in the signal Raman gain by analyzing simultaneous changes in the OSC power and the signal power. In an embodiment, the detection unit may include two ASE detectors configured to measure ASE powers within two ASE wavelength bands different from and located on opposite sides of the communication band and the GCC unit may be further operative to calculate the signal Raman gain tilt based on the two measured ASE powers. In some embodiments, the DRA may be part of a hybrid Raman/EDFA amplifier.

In some embodiments, there is provided a method for automatic gain measurement and control of a DRA, the DRA providing Raman pump power at one or more pump wavelengths and being optically coupled to a transmission fiber which carries communication signals having wavelengths in a signal communication band, the method including measuring, during operation of the DRA, the optical power of a filtered component of the light entering the DRA from the transmission fiber, and calculating a signal Raman gain property based on the measured optical power. In an embodiment, the method further includes using the signal Raman gain property to control the pump power.

BRIEF DESCRIPTION OF THE DRAWINGS

Non-limiting examples of embodiments of the invention are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments of the invention, but should not be considered limiting in any way. In particular, variations and modifications apparent to those skilled in the art may be considered without departing from the claimed scope.

DETAILED DESCRIPTION OF THE PREFERRED EMBODIMENTS

Figure 2A:
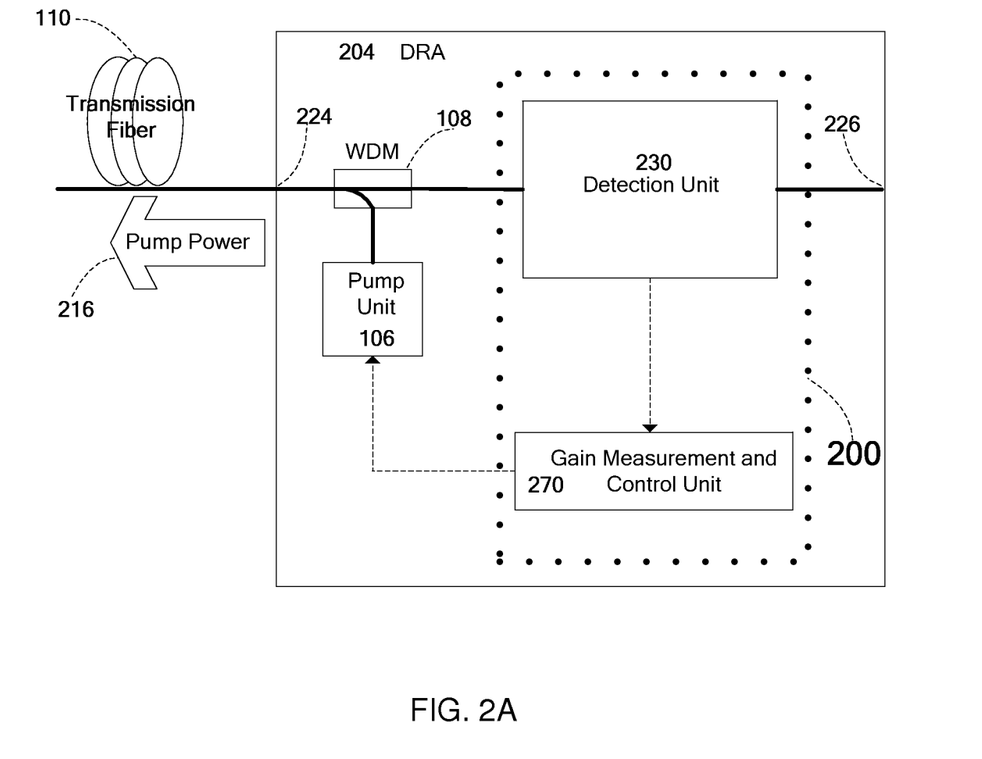
FIG. 2A shows schematically an apparatus for gain measurement and control in an embodiment of the invention.

FIG. 2A shows schematically an apparatus for gain measurement and control in an embodiment of the invention, the apparatus marked as 200. As shown, apparatus 200 is included in a DRA 204 which may be either a forward or a backward DRA. As in known DRAs, DRA 204 includes a pump unit 106 and a WDM 108 to supply pump power 216 to transmission fiber 110. Apparatus 200 includes a detection unit 230 and a gain calculation and control (GCC) unit 270. Note that in some embodiments, apparatus 200 need not be physically located in the same physical enclosure as pump unit 106 and WDM 108. Detection unit 230 is configured to measure both before and during operation of the DRA, the optical power of a filtered component of the light entering DRA 204 via an input port 224 from a transmission fiber 110. As used herein, "during operation" refers to a state in which the Raman pumps are operational and a communication signal is being transmitted along the transmission fiber.

Detection unit 230 is coupled electrically to GCC unit 270, which receives as input an electrical signal corresponding to each of the optical powers measured by detection unit 230. Based on this electrical input, GCC unit 270 processes and calculates one or more properties of the signal Raman gain. Optionally, GCC unit 270 then outputs an electrical control signal to pump unit 206 to adjust the power of one or more of the pump wavelengths output by the pump unit. GCC unit 270 may include a micro-processor, memory, and/or other electronic circuits as known in the art in order to perform the necessary calculations and control functions. Additionally, GCC unit 270 may be part of a larger unit which performs additional control and monitoring functions for the DRA. The properties of the signal Raman gain calculated by GCC unit 270 may include, for example, the average on-off signal Raman gain within the communication band, the average net Raman signal gain within the communication band, the net or on-off Raman signal gain tilt within the communication band, the net or on-off signal Raman gain within a sub-band located within the communication band, etc.

Figure 2B:
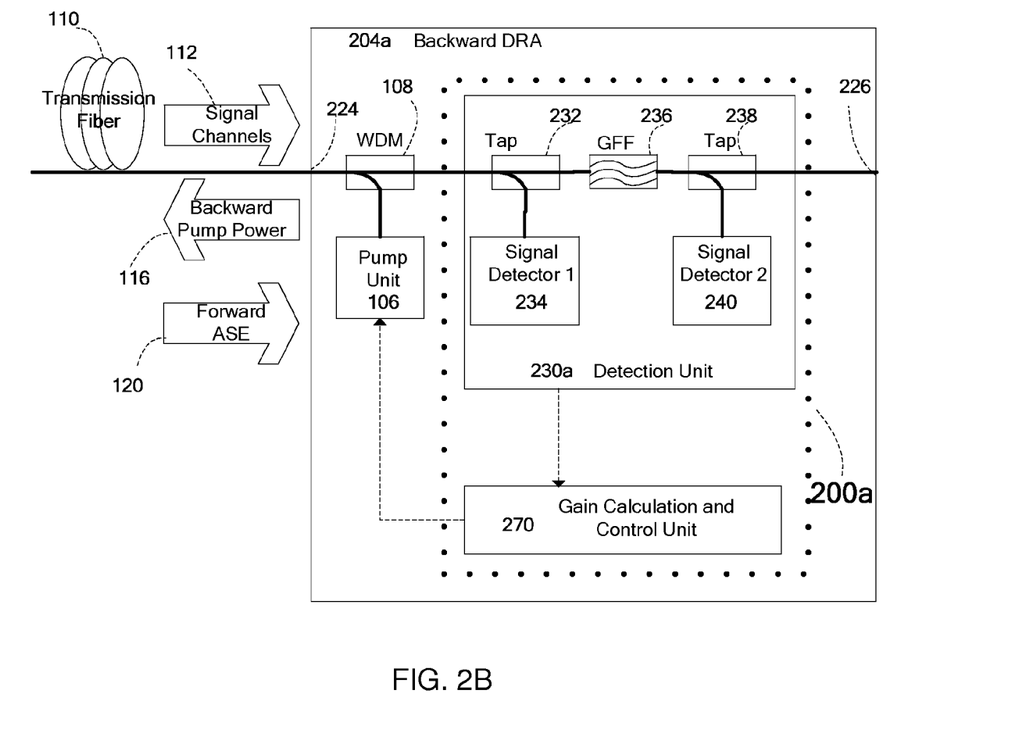
FIG. 2B shows schematically an apparatus for gain measurement and control in another embodiment of the invention.

FIG. 2B shows schematically an apparatus for gain measurement and control in another embodiment of the invention, the apparatus marked as 200a. As shown, apparatus 200a is included in a backward DRA 204a. Note that in some embodiments, apparatus 200a need not be physically located in the same physical enclosure as pump unit 106 and WDM 108. Apparatus 200a includes a detection unit 230a and a GCC unit 270. Detection unit 230a includes a first tap 232, a first signal detector 234, a Gain Flattening Filter (GFF) 236 configured to spectrally flatten the signal Raman gain within the communication band, a second tap 238 and a second signal detector 240. First tap 232 taps a small portion (typically 1-2%) of the light coming from input port 224, and directs this portion to first signal detector 234. Detector 234 is calibrated to measure the light power at input 224. Second tap 238, placed after GFF 236, taps a small portion (typically 1-2%) of the light coming from GFF 236, and directs this portion to a second signal detector 240, which is calibrated to measure the light power at output 226.

Figure 3:
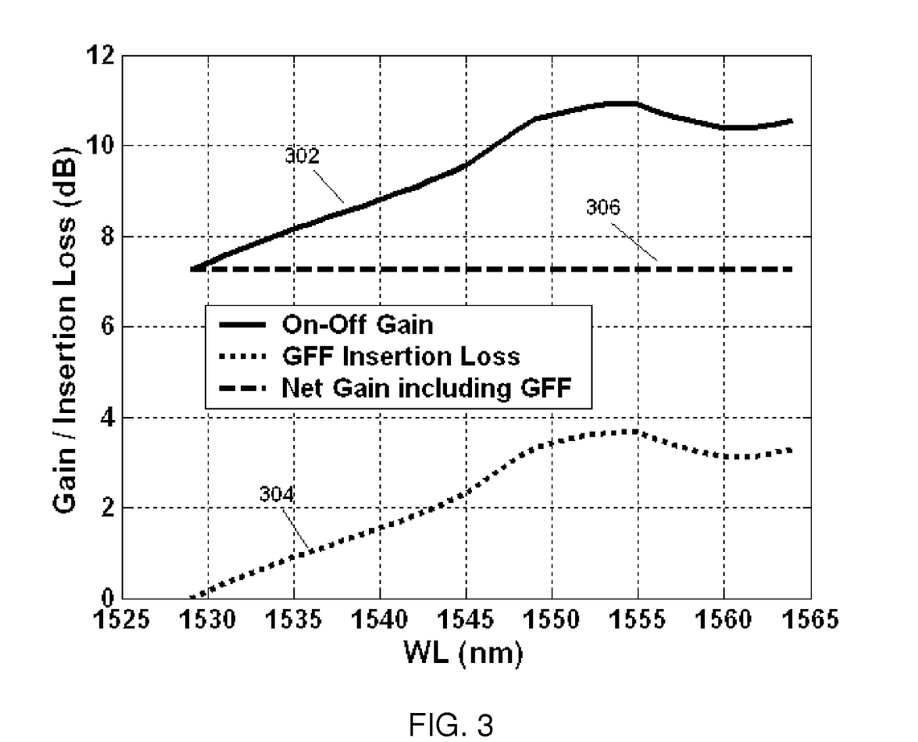
FIG. 3 shows a graph illustrating the use of a GFF to flatten the signal Raman on-off gain.

In operation, GFF 236 ensures that the spectral shape of the net gain provided by the DRA is flat to within a specified tolerance across the entire communication band. This is achieved by designing GFF 236 such that the spectral dependence of its insertion loss compensates the spectral dependence of the signal Raman gain provided by pump unit 206. The use of a GFF is illustrated by FIG. 3, where a curve 302 shows an exemplary on-off Raman gain spectrum obtained using a single Raman pump at approximately 1454 nm. Curve 304 shows the insertion loss of a GFF designed to compensate the on-off Raman gain spectrum, while curve 306 shows the net flattened Raman gain including the effect of the GFF.

Returning now to FIG. 2B, GCC unit 270 calculates the net Raman signal gain provided by the DRA by taking a first reading from first signal detector 234 before pump unit 106 is turned on (i.e. before operation), then taking a second reading from second signal detector 240 after pump unit 106 is turned on (i.e. during operation) and then calculating the net signal gain as the difference between the second and the first readings. In cases where the signal input power is low, it is necessary to correct the second reading to account for Raman ASE found within the communication band. Once the Raman ASE is subtracted from this second reading, the net signal gain can be calculated as above. Additionally, if the light coming from input 224 contains significant spectral components located outside the signal communication band, it may be necessary to employ a band pass filter before one or both of detectors 234 and 240 in order to ensure that only light found within the communication band reaches the detectors.

To understand the advantage of this apparatus, it is instructive to compare it to the case where only a single detector (for example signal detector 234) is used to measure the signal power both before and after the pumps are turned on. In this case, since the signal power is measured before GFF 236, the signal power after the pumps are turned on depends on the precise wavelength configuration of the signal channels within the communication band. If it were possible to know the precise wavelength configuration, then in principle the net Raman gain could be calculated using knowledge about the GFF design. However, since it is not possible to know the precise wavelength configuration, the net Raman gain cannot be measured accurately. As an example, let us consider the case shown in FIG. 3. If the wavelength configuration includes a single channel at 1530 nm, then an on-off gain of about 7.5 dB will be measured. If on the other hand the wavelength configuration includes a single channel at 1560 nm, then an on-off gain of about 10.5 dB will be measured. Since there is no way to determine what is the actual wavelength configuration without using additional and potentially costly components (such as an optical channel monitor or "OCM"), any attempt to estimate the net gain from this measurement will necessarily result in an error of at least +/−1.5 dB. A similar argument shows that using only signal detector 240 to measure the signal power both before and after the pumps are turned on will also result in an error.

However, using the apparatus of FIG. 2 as described above, the correct net gain will be measured regardless of the wavelength configuration of the signal channels. The reason for this is that by performing the signal measurement before the GFF when the pumps are off, and after the GFF when the pumps are on, the effect of the GFF is taken into account only when the pumps are on.

As just shown, the use of a GFF to achieve flat net gain of the DRA allows the gain to be measured accurately. However, achieving a flat net gain of the DRA is also important from other aspects. In a lumped amplifier, such as an EDFA, the gain is measured directly using the input and output signal power detectors. This means that even if the gain is not flat, the AGC control loop of the lumped amplifier will maintain the required average gain when the there is a change in the signal channels wavelength configuration during operation. On the other hand, in a DRA where the gain is not measured directly during operation, the AGC loop cannot guarantee a constant gain when the signal channels wavelength configuration changes during operation (unless a potentially costly OCM is used). Thus, the use of a GFF ensures that the signal gain remains constant, even if the signal channels wavelength configuration changes during operation. When the DRA is part of a multi-stage amplifier, it is important to ensure that the GFF is designed to compensate only the Raman gain provided by the DRA, not the combined gain of the entire amplifier. If required, the other amplifier stages may have their own GFFs. An example of a multi-stage amplifier is a hybrid Raman/EDFA amplifier, in which the first gain stage is a DRA and the second gain stage is an EDFA. In this case the DRA stage would have its own GFF, as shown in FIG. 2B, and the EFDA would typically also have its own GFF.

Figure 4:
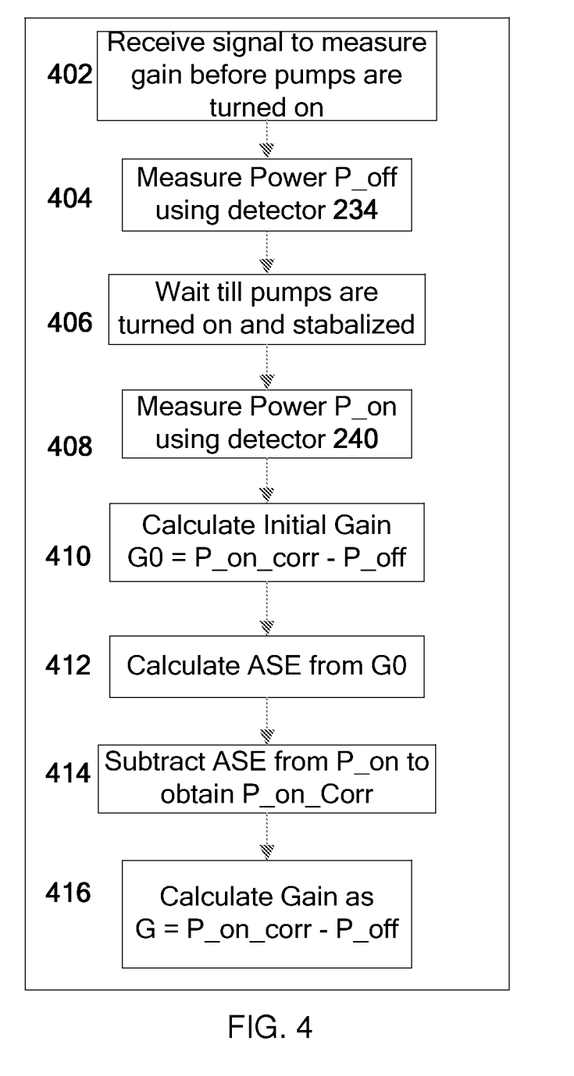
FIG. 4 shows an algorithm for calculating the signal Raman gain according to an embodiment of the invention.

FIG. 4 shows an algorithm for calculating the signal Raman gain. The algorithm starts with step 402, when an instruction is received from the system management/operator (not shown) via a communication command to turn the pump units on. In step 404, a power P_off is read by the GCC unit 270 from detector 234 before the pumps are turned on. In step 406, GCC unit 270 waits for the pumps to be turned on and stabilized. In step 408, a power P_on is read the GCC unit from detector 240. In step 410, an initial gain G0 is calculated as the difference between P_on and P_off. If the signal power is sufficiently low and the DRA gain sufficiently high, then ASE power generated by the DRA may form a significant part of the total power P_on. In this case, the gain G0 is not the real signal gain and needs to be corrected. For this purpose, the ASE is calculated from the gain G0 in step 412 (for example, using a pre-stored look-up table or formula), and then subtracted from P_on to obtain a corrected value P_on_Corr in step 414. Finally, in step 416 the gain G is calculated as the difference between P_on_Corr and P_off. In some cases, additional iterations of steps 412-416 may be needed to achieve an even more accurate value of the gain. Typically, the higher the ASE and the lower the signal power, the more iterations will be needed. Optionally, a convergence condition for the gain G may be used to determine the required number of iterations. In some cases, the DRA may contain a separate ASE detection sub-unit, as for example shown in FIG. 6. In such cases, the ASE may be directly measured and need not be calculated as in step 412.

Figure 5:
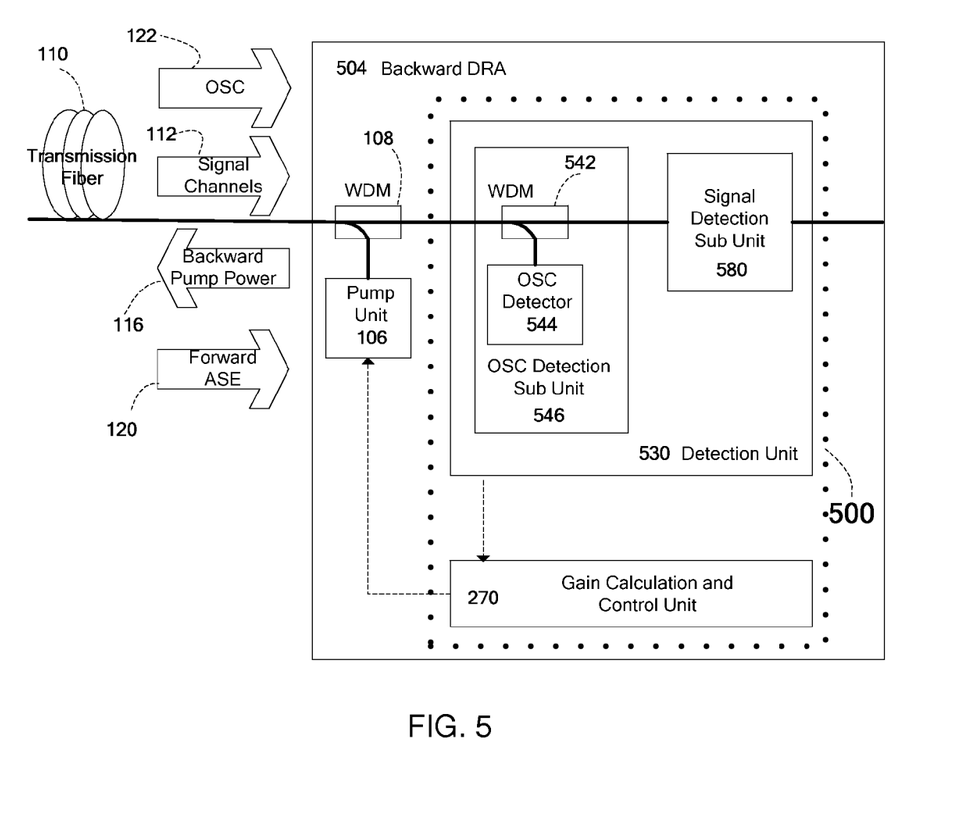
FIG. 5 shows schematically an apparatus for gain measurement and control in yet another embodiment of the invention.

FIG. 5 shows schematically an apparatus for gain measurement and control in yet another embodiment of the invention, the apparatus marked as 500. As shown, apparatus 500 is included in a backward DRA 504. Note that in some embodiments, apparatus 500 need not be physically located in the same physical enclosure as pump unit 106 and WDM 108. Apparatus 500 includes a detection unit 530 and a GCC unit 270. Detection unit 530 includes an OSC detection sub-unit 546 for detecting the power of the OSC. OSC detection sub-unit 546 includes a WDM 542 which separates the OSC wavelength band (for example 1500 nm-1520 nm) from the communication wavelength band, and directs the power in the OSC wavelength band to an OSC detector 544. If the power of the OSC is small compared to the ASE power within the OSC wavelength band, then OSC detector 544 may be configured to detect only AC power relevant to the modulation format of the OSC. For example, if the OSC is a 2 Mb/s channel, OSC detector 544 may be configured to detect only AC power in a narrow 200 KHz bandwidth centered around 2 MHz. In this way, OSC detector 544 can accurately measure the power of the OSC even in the presence of significant ASE noise which may be present in the OSC wavelength band.

In a typical optical communications system, the OSC is always present and its wavelength and launch power are well defined and do not change with time. This is in contrast with the signal channels, whose power and wavelength configuration may change over time. This makes it advantageous to utilize the OSC to measure the signal Raman gain. In operation, GCC unit 270 measures the OSC signal power before the pumps are turned on, and again after the pumps are turned on and have stabilized, and calculates the OSC Raman gain as the difference between the two readings. Then, a pre-determined relation is applied to derive the signal Raman gain from the OSC Raman gain. For example, if the OSC is located at 1510 nm, and the communication band is the C-Band, then the OSC Raman gain in dB is typically about 0.8 times the signal Raman gain in dB.

Once the Raman pumps have been turned on, it is advantageous to be able to detect and measure any change which may occur in the signal Raman gain over time. This cannot be achieved simply by monitoring the OSC power over time. For example, if some loss develops at the beginning of transmission fiber 110, the OSC power will decrease but this does not mean that the signal Raman gain has decreased (since the Raman gain occurs substantially in the last 30-50 km of transmission fiber 110). To overcome this problem, it is possible to also measure the signal power over time using a signal detection sub-unit 580. Signal detection sub-unit 580 can be configured as in FIG. 2A (e.g. to include elements 232-240) in the case where backward DRA 504 also includes a GFF, or may simply comprise a tap and a detector in the case where a GFF is not included. In both cases, signal detection sub-unit 580 monitors the power in the communication band once the pump has turned on During operation, GCC unit 270 continuously measures the OSC power from OSC detection sub-unit 546 and the signal power from signal detection sub-unit 580 and is configured to detect a simultaneous change in both powers. If such a change occurs, and its sign and magnitude in dB is the same for both powers, then it is assumed that some change has occurred in the loss of transmission fiber 110, but that this change does not signify a change in the signal Raman gain. However, if the sign of the change is same for both power, but the magnitude in dB is different, then this signifies a change in the signal Raman gain which can be derived accordingly. Using the above example where the OSC is at 1510 nm and the communication band is the C-Band, a change of X dB in the communication band power and a corresponding change of 0.8*X dB in the OSC power signifies a change of X dB in the signal Raman gain.

An intermediate case may also occur where there is a Y dB change in the loss of the transmission fiber, which causes a Y dB change in both the signal power and the OSC power. However, if the change in loss occurs at a point within about 50 km of the backward DRA, then this change in loss of the transmission fiber may also lead to a change of X dB in the signal Raman gain. Thus, the signal power will change by dP_Sig=Y+X dB (where "dP" stand for "change in power") while the OSC power will change by dP_OSC=Y+0.8*X dB (using the above example by way of illustration). Thus, by measuring both dP_Sig and dP_OSC, X can be extracted, and the change in signal Raman gain can be accurately measured.

Figure 6:
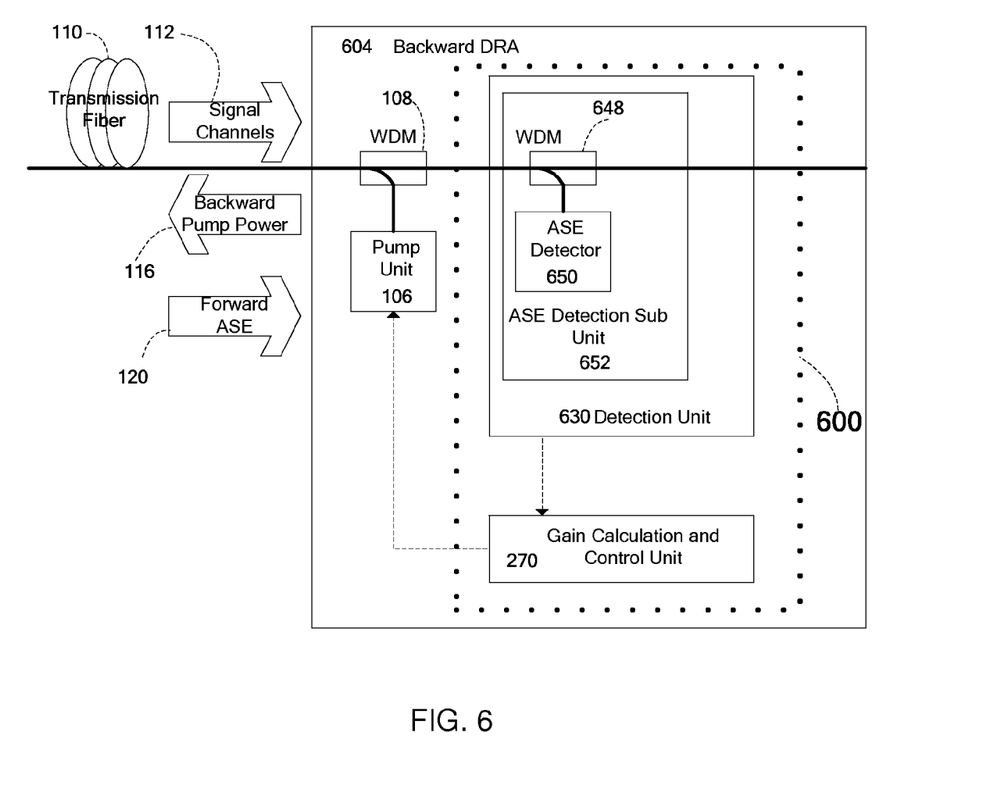
FIG. 6 shows schematically an apparatus for gain measurement and control in yet another embodiment of the invention.

FIG. 6 shows schematically an apparatus for gain measurement and control in yet another embodiment of the invention, the apparatus marked as 600. As shown, apparatus 600 is included in a backward DRA 604. Note that in some embodiments, apparatus 600 need not be physically located in the same physical enclosure as pump unit 106 and WDM 108. Apparatus 600 includes a detection unit 630 and a GCC unit 270. Detection unit 630 includes an ASE detection sub-unit 652 for measuring the ASE power in a wavelength band different from that of the communication band (and also different from that of the OSC band if an OSC exists in the optical communications system). For example, in a system where the communication band is the C-Band and the OSC is found in the 1500-1520 nm band, the different ASE band may be defined as 1520-1525 nm ASE detection sub-unit 652 includes a WDM 648 which separates the ASE wavelength band from the communication and OSC wavelength bands, and directs the power in the ASE wavelength band to ASE detector 650. WDM 648 may alternatively be implemented using a combination of a tap connected to a band pass filter.

The advantage of measuring ASE power in a wavelength band that is different from both the communication band and the OSC band is that only ASE generated by the Raman effect is found in this band. Thus, measuring power in this ASE band yields a clean measurement relating only to the Raman effect, not obstructed by other elements such as signal power or OSC power. In operation, GCC unit 270 measures the ASE power for different levels of pump power. This can be achieved either by gradually turning on the pumps, or by varying the pump power during operation of the DRA. In either case, a measurement is taken from ASE detection sub-unit 652 at each level of pump power. In this manner, a graph is constructed relating ASE power to pump power generated by pump unit 106. A linear fit is then applied to this graph, and using this linear fit the mathematical derivative of the ASE power to pump power ("d/dPP") is calculated. In some cases it may be enough to take only two measurements of the ASE power at two different pump power levels to obtain a sufficient estimate of d/dPP.

Figure 7:
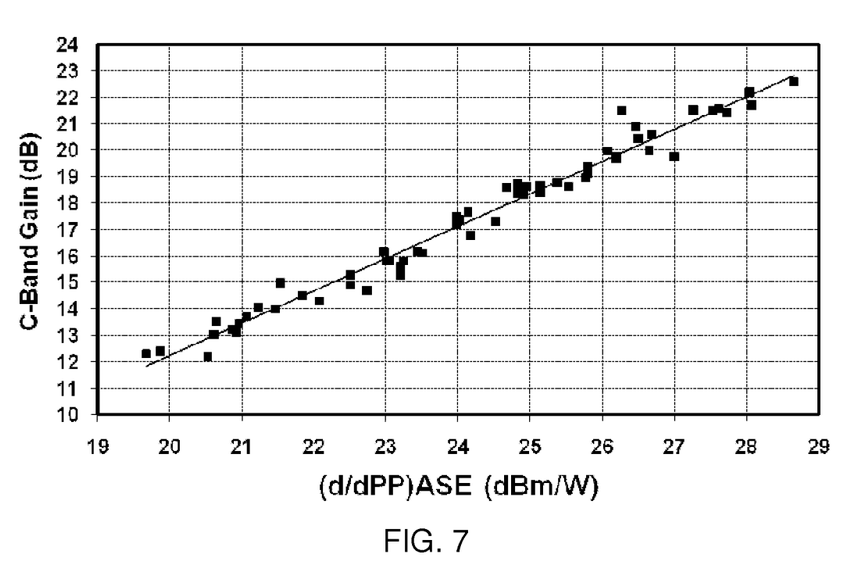
FIG. 7 shows an example graph relating the derivative of the ASE power with respect to pump power to the signal Raman gain in the C-B and obtained using an embodiment of the invention.

FIG. 7 shows the calculated d/dPP values obtained from measurements vs. C-band gain. For each d/dPP measurement, a corresponding measurement was taken for the signal gain when the pumps were operating at their full power. These measurements were taken with ASE measured in the 1520-1525 nm band and with the communication band being the C-Band. The pump wavelengths were 1425 and 1455 nm. The measurements were taken for many types of transmission fiber (e.g. G.652, G.654, G.655 etc), and also for different condition of the transmission fiber (e.g. different amount of discrete loss located at different point along the transmission fiber). As seen, a very good correlation exists between the d/dPP and the signal gain. This correlation holds for all types of transmission fibers and all transmission fiber conditions. Thus, once GCC unit 270 has calculated the d/dPP after pumps turn-on, the corresponding signal gain can be derived using a relationship similar to that shown in FIG. 7.

Once the Raman pumps have been turned on, it is advantageous to be able to detect and measure any change which may occur in the signal Raman gain over time. This can be achieved with reasonable accuracy by configuring GCC unit 270 to detect a change in the ASE power measured by ASE detection sub-unit 652. If a change occurs in the ASE power, then this also indicates a change in the signal Raman gain. An estimate for the change in the signal Raman gain can be obtained by utilizing a known predetermined relationship between a change in the ASE power and a change in the signal Raman gain. A signal detection sub-unit (similar to element 580 described in relation to FIG. 5) may also be utilized such that simultaneous changes in the ASE and signal power may be measured. These simultaneous changes can then be analyzed to more accurately determine the change in signal Raman gain.

ASE detection sub unit 652 may also be utilized for other purposes besides signal Raman gain measurement. One such purpose is to correct the reading of a detector configured to measure the power of the signal channels, as described above in relation to FIG. 4. Since the detector measures the total power within the communication band, which includes both signal power and ASE, it is necessary to subtract the ASE power within the communication band to obtain the signal power. To achieve this, it is possible to utilize a known predetermined relation between the ASE measured by ASE detection sub-unit 652 (which is in a different wavelength band than the communication band), and the ASE within the communication band. For example, in the case where pump unit 106 includes one or more pumps at wavelength 1425 nm and one or more pumps at wavelength 1455 nm, and where the ratio between the power at 1455 nm to the power at 1425 nm is approximately 1.5, then the following relation holds between the ASE in the 1520-1525 nm band and the ASE in the communication band 1530-1560 nm:

$$ASE\_1530\text{-}1560 \text{ (dB)} = 1.18 * ASE\_1520\text{-}1525 \text{ (dB)} + 13.9$$

Similar relations hold for other values of the ratio between the power at 1455 nm to the power at 1425 nm, such that the appropriate relation may be used for any given ratio.

Another related purpose of ASE detection sub-unit 652 is to derive the ASE power in the communication band, as just described, and to pass the derived result to an amplifier placed following the DRA, or to the next stage of a multi-stage amplifier. As mentioned, in a multi-stage amplifier, the DRA may be the first stage and an EDFA the second stage. The derived ASE power in the communication band is then used by the following amplifier or amplifier stage to correct the reading of an input power detector so as to obtain the actual input signal power without the ASE contribution. Such a correction mechanism can be very important when used in conjunction with a feed-forward transient suppression mechanism. The fact that ASE detection sub-unit 652 actually measures ASE power is of critical importance for obtaining a correct reading of the input signal power in the following amplifier or amplifier stage, which in turn is critical for achieving good transient suppression. Note that this actual measurement of ASE power is vastly advantageous and superior over known procedures of estimating (not measuring) the ASE power based on the pump power, which can lead to highly inaccurate results in many circumstances.

The apparatus shown in FIG. 6 can be equally well applied to Forward DRA, with the only difference being that instead of detecting a forward ASE such as ASE 120 as in FIG. 6, a backward ASE such as ASE 118 in FIG. 1 is used for the ASE detection.

Figure 8:
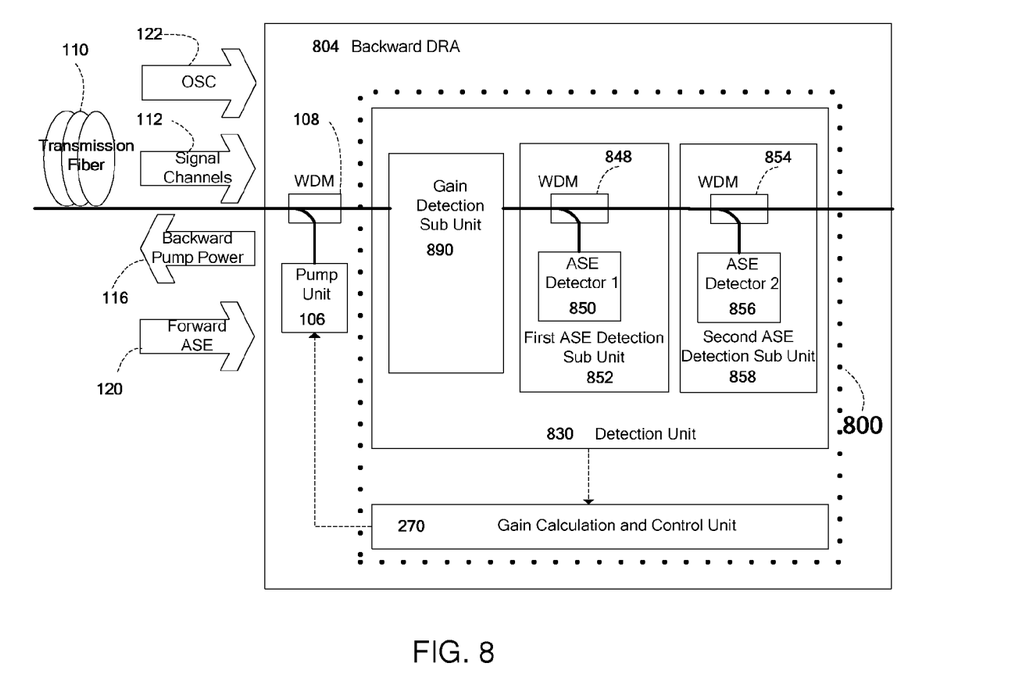
FIG. 8 shows schematically an apparatus for gain measurement and control in yet another embodiment of the invention.

FIG. 8 shows schematically an apparatus for gain measurement and control in yet another embodiment of the invention, the apparatus marked as 800. As shown, apparatus 800 is included in a backward DRA 804. Note that in some embodiments, apparatus 800 need not be physically located in the same physical enclosure as pump unit 106 and WDM 108. Apparatus 800 includes a detection unit 830 and a GCC unit 270. Detection unit 830 includes here a gain detection sub-unit 890 which can be according to any of the above described implementations, and whose purpose is to provide GCC unit 270 with data required to measure the signal Raman gain. In addition, detection unit 830 also includes two ASE detection sub-units 852 and 858. First ASE detection sub-unit 852 includes a WDM 648 which separates a first ASE wavelength band which is different from the communication wavelength band, and directs the power in this first ASE wavelength band to a first ASE detector 850. Second ASE detection sub-unit 858 includes a WDM 854 which separates a second ASE wavelength band which is different from both the first ASE wavelength band and the communication wavelength band, and directs the power in this second wavelength band to a second ASE detector 856. The first ASE wavelength band and second ASE wavelength band are selected so as to be located on opposite sides of the communication wavelength band.

In operation, GCC unit 270 uses information from gain measurement unit 890, first ASE detection sub-unit 852 and second ASE detection unit 858 to measure the signal Raman gain and signal Raman gain tilt. For our purpose, we define the Raman gain tilt by applying a linear fit to the signal Raman gain as a function of wavelength, and then taking the difference between the value of the linear fit at the highest wavelength within the communication band and the value of the linear fit at the lowest wavelength within the communication band.

Figure 9:
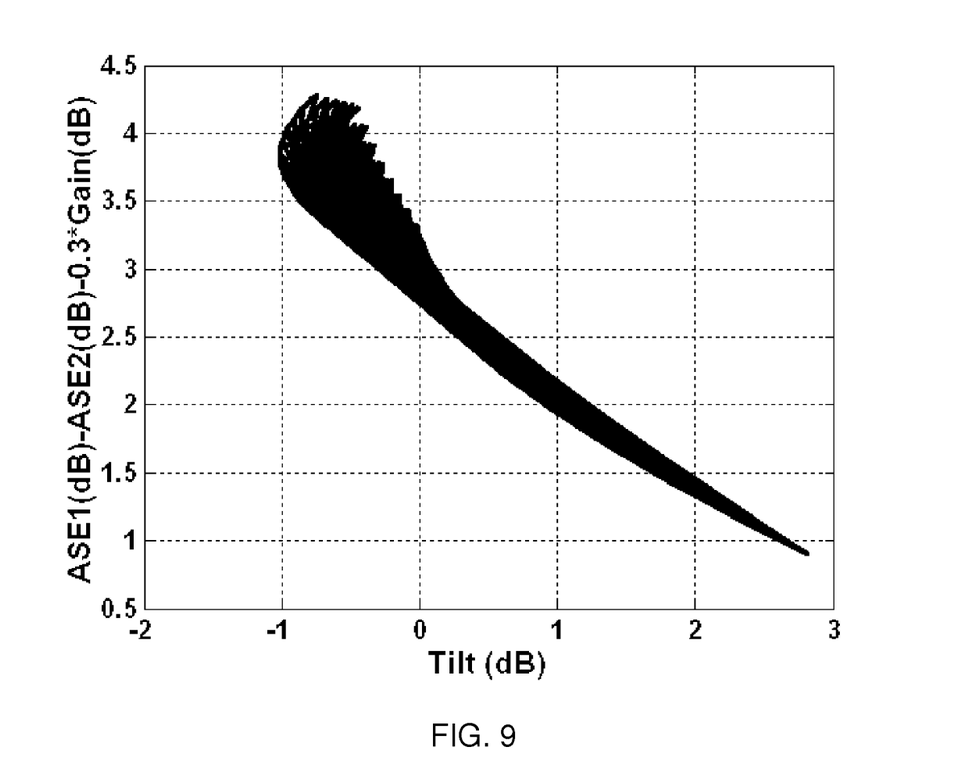
FIG. 9 shows a graph relating the signal Raman gain tilt to the difference between the ASE powers in two different wavelength bands at either end of the communication band, as provided by an embodiment of the invention.

Since the two ASE wavelength bands are on opposite sides of the communication band, the difference between the two ASE powers reflect the Raman gain tilt. FIG. 9 shows the relation between the Raman gain tilt and a value, which we call the tilt predictor, which is derived from the two ASE powers and the signal Raman gain. In this example the communication band is the C-Band, the first ASE wavelength band is 1520-1525 nm, and the second ASE wavelength band is 1570-1575 nm, and the tilt predictor is derived as the difference between the first ASE power and the second ASE power, minus 0.3 times the signal Raman gain. This graph was generated for many types of transmission fiber (e.g. G.652, G.654, G.655 etc), and also for different condition of the transmission fiber (e.g. different amount of discrete loss located at different point along the transmission fiber). As can be seen, reasonable correlation exists between the actual signal Raman gain tilt and the tilt predictor, providing a means of measuring the signal Raman gain tilt. In operation, GCC unit 270 uses data from gain detection sub-unit 890 to calculate the Raman signal gain, and then together with the two ASE powers, derives the tilt predictor. A relation similar to that shown in FIG. 9 is then used to derive the signal Raman gain tilt.

The apparatus shown in FIG. 8 can be equally well applied to Forward DRA, with the only difference being that instead of detecting a forward ASE such as ASE 120 as in FIG. 8, a backward ASE such as ASE 118 in FIG. 1 is used for the ASE detection.

In FIGS. 2A, 2B, 5, 6 and 8, GCC unit 270 can optionally utilize the calculated signal Raman gain properties in order to control the pump unit. Often this control will take the form of a feed-back control loop, where the GCC unit is configured to keep the Raman signal gain constant at a required level. In the case in which the pump unit includes only a single pump, the control loop used to keep constant gain may be a conventional feed-back control loop as known in the art. Briefly, if the measured gain is above or below the required gain, then the GCC unit respectively reduces or increases the pump power by an amount proportional to the difference between the current and required gain. In the case in which the pump unit includes more than one pump, especially if one or more of the pumps are at different wavelengths, then it is necessary to control all pumps such as to maintain flat gain on the one hand, while achieving the required signal gain on the other. This can be achieved by utilizing a predetermined relation between the signal gain and the ratio between the different pump powers.

Figure 10:
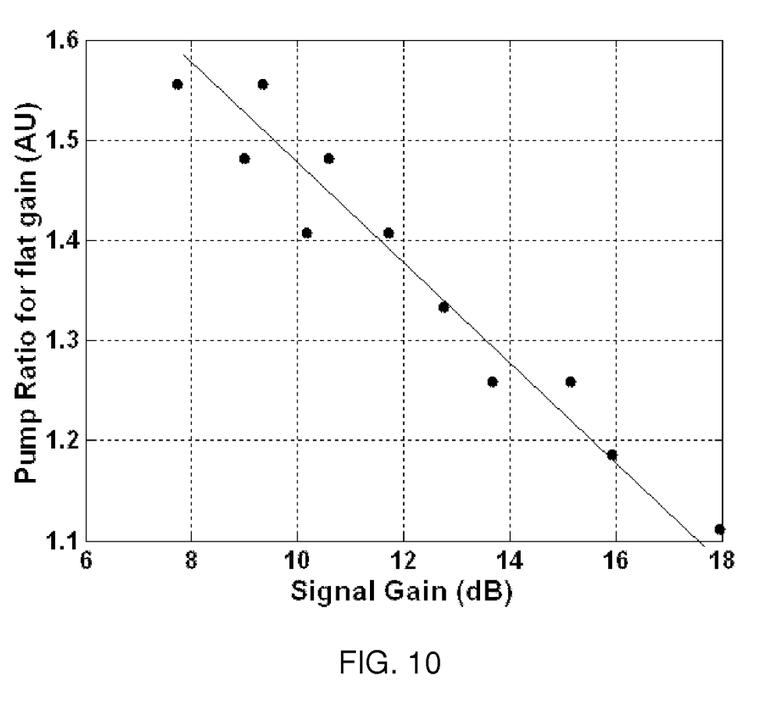
FIG. 10 shows an example graph relating the ratio between pump powers at different wavelengths required to achieve flat signal Raman gain, as a function of the signal Raman gain.

For example, FIG. 10 shows an example of such a predetermined relation for the case where the pump unit includes one or more pumps at wavelength 1425 nm and one or more pumps at wavelength 1455 nm. The ratio between the total power at the two wavelengths required to achieve flat gain ("Pump ratio") is plotted as a function of the signal Raman gain for different types of transmission fibers. As seen, there is good correlation between this ratio and the signal gain. This correlation can be used by the GCC unit to achieve the required gain while at the same time maintaining flat gain. For example, if it is required to achieve signal Raman gain of 12 dB, then the ratio will be kept constant at 1.4 and the total power of all the pumps will be changed until the measured gain matches the required gain.

If for some reason it is required to achieve a signal Raman gain tilt different to zero (i.e. non-flat gain), then a graph similar to FIG. 10 can be generated for different values of signal Raman gain tilt, and a similar method to that described above can be used to achieve the required signal Raman gain and signal Raman gain tilt.

Optionally, when the detection unit is also configured to measure signal Raman gain tilt, as for example shown in FIG. 8, the GCC unit may be configured to control the pump unit so as to maintain both a required signal Raman gain and a required signal Raman gain tilt. In this case, the signal Raman gain can be controlled by changing the total pump power, while the signal Raman gain can be controlled by changing the ratio between the pump powers at different wavelengths. The two control loops may operate in tandem to keep the signal Raman gain and signal Raman gain tilt at the required values.

The invention has been described with reference to embodiments thereof that are provided by way of example and are not intended to limit its scope. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of ordinary skill in the art. The scope of the invention is limited only by the following claims.

The invention claimed is:

1. An apparatus for automatic gain measurement and control of a distributed Raman amplifier (DRA), the DRA providing Raman pump power at one or more pump wavelengths and being optically coupled to a transmission fiber which carries communication signals having wavelengths in a signal communication band, the apparatus comprising:
   a) a detection unit operative to filter light entering the DRA from the transmission fiber to provide a filtered component of light and to measure, during operation of the DRA, optical power of at least the filtered component of light; and,
   b) a gain calculation and control (GCC) unit electrically coupled to the detection unit and operative to calculate a signal Raman gain property based only on the measured optical power.

2. The apparatus of claim 1, wherein the detection unit includes an optical supervisory channel (OSC) detector configured to measure the power of an OSC transmitted through the transmission fiber in an OSC band.

3. The apparatus of claim 2, wherein the detection unit further includes a signal detection sub-unit operative to measure the signal power and wherein the GCC unit is further operative to determine a change in the signal Raman gain property by analyzing simultaneous changes in the OSC power and the signal power.

4. The apparatus of claim 1, wherein the detection unit includes an amplified spontaneous emission (ASE) detector configured to measure the ASE power in a wavelength band different from that of the communication band and of an optical supervisory channel band.

5. The apparatus of claim 1, wherein the detection unit includes two amplified spontaneous emission (ASE) detectors configured to measure ASE powers within two ASE wavelength bands different from and located on opposite sides of the communication band.

6. A method for automatic gain measurement and control of a distributed Raman amplifier (DRA), the DRA providing Raman pump power at one or more pump wavelengths and being optically coupled to a transmission fiber which carries communication signals having wavelengths in a signal communication band, the method comprising:
   a) filtering light entering the DRA from the transmission fiber to provide a filtered component of light;
   b) measuring during operation of the DRA, optical power of at least the filtered component of light; and
   c) calculating a signal Raman gain property based only on the measured optical power.

7. The method of claim 6, further comprising the step of measuring, before operation of the DRA, the power of an optical supervisory channel (OSC) transmitted through the transmission fiber in an OSC band, wherein the filtered component includes OSC light in an OSC band, and wherein the step of calculating includes using the measurement before operation of the DRA and the measurement during operation of the DRA to calculate the signal Raman gain property.

8. The method of claim 7, further including the step of measuring the signal power in the communication band, and wherein the step of calculating further includes determining a change in the signal Raman gain property by analyzing simultaneous changes in the OSC power and the signal power.

9. The method of claim 6, wherein the filtered component includes ASE in an ASE wavelength band different from that of the communication band and of an optical supervisory channel band, wherein the measuring is performed at various levels of Raman pump power, and wherein the step of calculating includes using the results of the measurement of the ASE light optical power at various levels of Raman pump powers in the calculation of the signal Raman gain property.

10. The method of claim 6, wherein the filtered component includes ASE in an ASE wavelength band different from that of the communication band and of an optical supervisory channel band, and wherein the step of calculating includes determining a change in the signal Raman gain property by analyzing changes in the ASE power.

11. The method of claim 6, wherein the filtered component includes a first ASE component in a first ASE wavelength band different from and located on a first side of the communication band, and a second ASE component in a second ASE wavelength band different from and located on a second side of the communication band, wherein the optical powers of the first and second ASE components are measured separately, and wherein the step of calculating includes using the two ASE powers to calculate the signal Raman gain property.

12. An apparatus for automatic gain measurement and control of a distributed Raman amplifier (DRA), the DRA providing Raman pump power at one or more pump wavelengths and being optically coupled to a transmission fiber which carries communication signals having wavelengths in a signal communication band, the apparatus comprising:
   a) a detection unit operative to filter light entering the DRA from the transmission fiber to provide a filtered component of light and to measure, during operation of the DRA, optical power of at least the filtered component of light; and,
   b) a gain calculation and control (GCC) unit electrically coupled to the detection unit and operative to calculate a signal Raman gain property based only on the measured optical power, wherein the signal Raman gain property is a property selected from the group consisting of a wavelength averaged on-off signal Raman gain, a wavelength averaged net signal Raman gain and a signal Raman gain tilt.

13. The apparatus of claim 12, wherein, based on the calculated signal Raman gain property, the GCC unit is further operative to control the pump power.

14. The apparatus of claim 12, wherein the detection unit includes a gain flattening filter (GFF) configured to spectrally flatten a signal Raman gain, a first signal detector configured to detect the optical power of the light before it passes through the GFF and a second signal detector configured to detect the optical power of the light after it passes through the GFF.

15. The apparatus of claim 14, wherein the GCC unit is further operative to calculate a net signal Raman gain by taking a first reading from the first signal detector before operation of the DRA, taking a second reading from the second signal detector during operation of the DRA, and calculating a difference between the second and the first readings.

16. The apparatus of claim 12, wherein the control of the pump power results in a required average signal Raman gain, while maintaining the signal Raman gain spectrally flat.

17. The apparatus of claim 12, wherein the DRA is part of a hybrid Raman/EDFA amplifier.

18. A method for automatic gain measurement and control of a distributed Raman amplifier (DRA), the DRA providing Raman pump power at one or more pump wavelengths and being optically coupled to a transmission fiber which carries communication signals having wavelengths in a signal communication band, the method comprising:
   a) filtering light entering the DRA from the transmission fiber to provide a filtered component of light;
   b) measuring during operation of the DRA, optical power of at least the filtered component of light; and
   c) based only on the measured optical power, calculating a signal Raman gain property selected from the group consisting of a wavelength averaged on-off signal Raman gain, a wavelength averaged net signal Raman gain and a signal Raman gain tilt.

19. The method of claim 18, further comprising:
   d) using the signal Raman gain property to control the pump power.

20. The method of claim 18, further comprising the step of measuring, before operation of the DRA, the optical power of the light entering the DRA from the transmission fiber, wherein the filtered component includes light passed through a gain flattening filter, and wherein the step of calculating includes using the measurement before operation of the DRA and the measurement during operation of the DRA to calculate the signal Raman gain property.

21. The method of claim 18, wherein the using the signal Raman gain property to control the pump power includes achieving a required average signal Raman gain within the communication band while maintaining the signal Raman gain spectrally flat.

* * * * *